United States Patent
Kanigicherla et al.

(10) Patent No.: US 9,430,028 B2
(45) Date of Patent: Aug. 30, 2016

(54) SYSTEMS AND METHOD FOR PROVIDING HIERARCHICAL COMPUTING IN WEARABLE PROCESSING UNITS

(71) Applicant: INEDA SYSTEMS PVT. LTD, Hyderabad, Andhra Pradesh (IN)

(72) Inventors: Balaji Kanigicherla, Andhra Pradesh (IN); Siva Raghuram Voleti, Andhra Pradesh (IN); Pradeep Elamanchili, Andhra Pradesh (IN); Murthy Dhulipala, Andhra Pradesh (IN); Sridhar Adusumilli, Andhra Pradesh (IN)

(73) Assignee: INEDA SYSTEMS PVT. LTD. (IN)

( * ) Notice: Subject to any disclaimer, the term of this patent is extended or adjusted under 35 U.S.C. 154(b) by 239 days.

(21) Appl. No.: 14/285,532

(22) Filed: May 22, 2014

(65) Prior Publication Data

US 2015/0149797 A1 May 28, 2015

(30) Foreign Application Priority Data

Nov. 27, 2013 (IN) .......................... 5466/CHE/2013

(51) Int. Cl.
*G06F 1/32* (2006.01)
(52) U.S. Cl.
CPC .............. *G06F 1/324* (2013.01); *G06F 1/325* (2013.01); *G06F 1/329* (2013.01); *G06F 1/3293* (2013.01); *Y02B 60/121* (2013.01); *Y02B 60/1217* (2013.01); *Y02B 60/144* (2013.01)
(58) Field of Classification Search
CPC .......................... G06F 1/3203; G06F 1/3234

USPC ......................................... 713/100, 300, 320
See application file for complete search history.

(56) References Cited

U.S. PATENT DOCUMENTS

| | | | | |
|---|---|---|---|---|
| 6,240,521 B1* | 5/2001 | Barber | .................. | G06F 1/3203 713/323 |
| 8,959,217 B2* | 2/2015 | Mayo | .................... | G06F 9/5077 709/226 |
| 9,020,890 B2* | 4/2015 | Kottomtharayil | . | G06F 17/30174 340/460 |
| 2004/0103265 A1* | 5/2004 | Smith | .................... | G06F 15/177 712/15 |
| 2004/0128382 A1* | 7/2004 | Shimoda | ............... | H04W 52/00 709/225 |
| 2008/0155100 A1* | 6/2008 | Ahmed | .................. | G06F 9/5011 709/226 |
| 2015/0282227 A1* | 10/2015 | Yousef | ................ | H04W 76/023 455/39 |

* cited by examiner

Primary Examiner — Chun Cao
(74) Attorney, Agent, or Firm — Workman Nydegger (57) ABSTRACT

A hierarchical wearable processing unit (HWPU) (102) for WPUs (100) is described. According to an implementation of the present subject matter, the HWPU (102) may include a plurality of hierarchies (106). Each hierarchy (106) from amongst the plurality of hierarchies (106) is determined for a particular performance and power consumption. Further, the HWPU (102) may include a plurality of hosts (104). One or more hosts (104) from amongst the plurality of hosts (104) are associated with each of the plurality of hierarchies (106) based on the particular performance and power consumption of each of the hierarchies (106). Furthermore, the HWPU (102) may include a control unit (118) to configure each of the plurality of hierarchies (106) with functionalities based on allocation of dedicated hardware resources.

25 Claims, 8 Drawing Sheets

SYSTEMS AND METHOD FOR PROVIDING HIERARCHICAL COMPUTING IN WEARABLE PROCESSING UNITS

CROSS-REFERENCE TO RELATED APPLICATIONS

This application claims priority to and the benefit of Indian Patent Application Serial No. 5466/CHE/2013, filed on Nov. 23, 2013, entitled "HIERARCHICAL WEARABLE PROCESSING UNIT", which is incorporated herein in its entirety.

TECHNICAL FIELD

The present subject matter, in general, relates to electronic devices and in particular to a processing unit for wearable electronic devices.

BACKGROUND

Advancement in the fields of information technology (IT) and computer science has made computing and communication devices an integral part of human life. Conventional devices have become more handy and compact and users prefer carrying those at all possible times. Of late wearable electronic devices have also become very popular.

Wearable technology improves living standards through different devices which can be worn by users. The wearable devices come in different form factors ranging from a simple wrist band to a smart watch, an ear piece to a pendant. The wearable electronic devices come in varying sizes and processing power and have an in-built power source, for example, rechargeable batteries. The batteries can be recharged using a power adapter, docking station, etc., from a power supply.

In recent years, the processing capabilities of wearable electronic devices have enhanced greatly. Increased processing power increases energy consumption, which in turn necessitates higher capacity batteries. However, this may increase the weight of the devices, which may be undesirable. If existing batteries are continued to be used, discharging would occur at very higher rate owing to the increased processing power of the wearable electronic devices and, therefore, may require frequent charging. Charging may not be always possible at all places, especially when a user of such a device is on the move.

Taking into consideration these facts, a tradeoff between the processing power and the battery life has to be made. However, market demands seldom allow such a compromise as there will always be a desire for wearable electronic devices that not only give high processing speed but also last long in terms of battery life.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 3 (a) illustrates a call flow diagram representing flow of events in a hierarchical WPU, in accordance with an embodiment of the present subject matter.

Any block diagrams herein represent conceptual views of illustrative systems embodying the principles of the present subject matter. Similarly, any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

The present subject matter relates to hierarchical computing architecture of a processing unit for WPUs, hereinafter referred to a wearable processing unit (WPU). Examples of WPUs include pedometers, smart watches, smart glasses, pendants, head mounted devices, etc. Although the described herein is provided with respect to a few example applications, the methods may be extended for various different applications using the WPU. The described systems and methods may also be implemented in various other communication protocols and communication networks to share network controllers amongst the plurality of hosts, albeit a few variations which will be apparent to those skilled in the art.

A typical WPU consists of sensor(s), a processing unit which collects data from the sensor(s) and provides user input output (IO), and a battery pack. In order to make a device truly wearable, the device has to be continuously usable without recharge for multiple days, or even multiple weeks.

The tasks performed by a typical WPU can be broadly categorized into sensing data, collection and storage of data, analysis of data which may include cloud based data analysis, and data presentation stages.

During the sensing data stage, the sensors of the WPU like accelerometers, gyroscopes, heart rate monitors, etc., perform the sense and collect respective data. In one implementation, the data sensed may be sent in a digital/analog format to a data collection unit or a processing unit. The data may be communicated through appropriate digital or analog (ADC) interfaces, such as Inter-Integrated Circuit (I2C), Universal Asynchronous Receiver/Transmitter (UART), and Serial Peripheral Interface (SPI).

Further, during the collection stage, the sensed data might go through initial processing like sample filtering, consolidation/averaging and tagging, before it is stored. During the data analysis stage, the stored data is analyzed in order to generate an output, which the WPU is meant for. It is generally the stage of data analysis which requires higher compute capabilities and utilizes a large amount of processing capability of the WPU.

In some situations, the analysis of the stored data is done by the processing unit of the WPU where the processing unit may include System-On-Chip with one or more embedded processors along with different connectivity peripherals, storage interfaces, acceleration units and On-chip or off-chip memory. In some situations where the WPU is not capable of supporting the analytics, the sensed data is provided to a cloud (distributed computing), or a paired host through wireless network, such as Wi-Fi and mobile radio network. Once the data is analyzed, either by the WPU itself, or with the help of an external processing unit, the data is presented to the user in the presentation stage, in an understandable format like number of steps taken by a user, heart rate of the user, ambient temperature, body temperature, etc.

WPUs utilizing high performance processing units, can enable rich graphical user interface (GUI) applications and multiple analysis records, such as multi day/week/month statistics and graphical representation of data. However, as the processing unit starts handling higher processing, it consumes higher power. Due to this reason, the current day WPUs with inbuilt analysis capabilities have lower battery life when compared to devices without analytics, given similar battery capacity. Therefore, the implementation of different processing units on a wearable computing device either lacks in performance or consumes excessive battery power to drain the battery in considerably less amount of time.

According to an implementation of the present subject matter, a multi-processor hierarchical computing architecture for the processing unit of the WPU is described. On one hand, the multi-processor hierarchical computing architecture of the WPU utilizes less power to utilize battery power for a longer duration, on the other hand, the multi-processor hierarchical computing architecture of the WPU provide sufficient processing capabilities for data analysis and other tasks of the WPU.

In one implementation of the present subject matter, a WPU includes a hierarchical wearable processing unit (HWPU). The HWPU may control and manage a plurality of processors of the WPU, referred to as hosts hereinafter. Each of such hosts may provide different processing capabilities to the WPU. In said implementation, each of the host from amongst the plurality of hosts may also run different operating systems depending upon the requirement of the WPU. It would be appreciated that the hosts of the WPU with high processing capabilities may consume higher power while those with moderate or low processing capabilities may consume relatively lesser power.

The HWPU may define multiple hierarchies of computation to perform different tasks and operations. That is, the HWPU may define a hierarchical structure where multiple hierarchies are identified and each hierarchy may provide different processing capability. The multiple hierarchies may be configured based on particular performance and power consumption. The particular performance and power consumption may either be a pre-defined performance and power consumption, or may be a run time performance and power consumption. Further, each hierarchy may include one or more hosts from amongst the plurality of hosts of the WPU based on the pre-defined processing capability, i.e., the particular performance, and the power consumption provided by the hierarchy. Tasks which may require higher processing capability may be provided to a hierarchy capable of performing higher processing while tasks which may require lower processing capability may be provided to another suitable hierarchy.

Further, one or more hierarchies may also be provided with different tasks at a given time instance to perform parallel processing for an effective utilization of processing power and battery of the WPU. Also, one task may be provided to more than one hierarchy to leverage parallel computing and utilize the available resources effectively. In one implementation, since the multiple hierarchies are managed by the HWPU, the division of tasks among the hierarchies may be based on processing and battery usage considerations.

In operation, different hardware resources of the WPU may either be dedicated among the hierarchies, or virtualized and shared across different compute hierarchies to provide seamless integration between the hierarchies and the hardware resources for execution of tasks. For example, different resources such as storage, input and output (I/O), audio, Bluetooth, and connectivity resources may be virtualized and distributed amongst the hierarchies. In one implementation, the distribution and sharing of the actual and virtualized resources of the WPU may be based on power consumption of each resource and processing consumption of each resource. That is, a resource which may require higher processing capabilities during its functioning may be provided to a hierarchy capable of performing higher processing, while a resource which may require lower processing capabilities may be provided to a hierarchy capable of performing relatively less processing.

In one implementation, some of the hardware resources which may be commonly utilized among either one or more hierarchies or all the hierarchies, may be virtualized and shared among the hierarchies accordingly. Further, apart from the sharing and distribution of hardware resources, essential data may also be shared and synchronized among the hierarchies.

Therefore, the distribution and sharing of hardware resources and the synchronization of data may allow the HWPU to seamlessly switch tasks to be performed by the WPU from one hierarchy to another. Seamless switching may provide users a unified view of application(s) supported by the WPU. Further, the implementation of HWPU and effective distribution and sharing of the hardware recourses among the hierarchies may eliminate the requisite of a high performance host to be active at all times and thereby reducing the power consumption.

Figure 1:
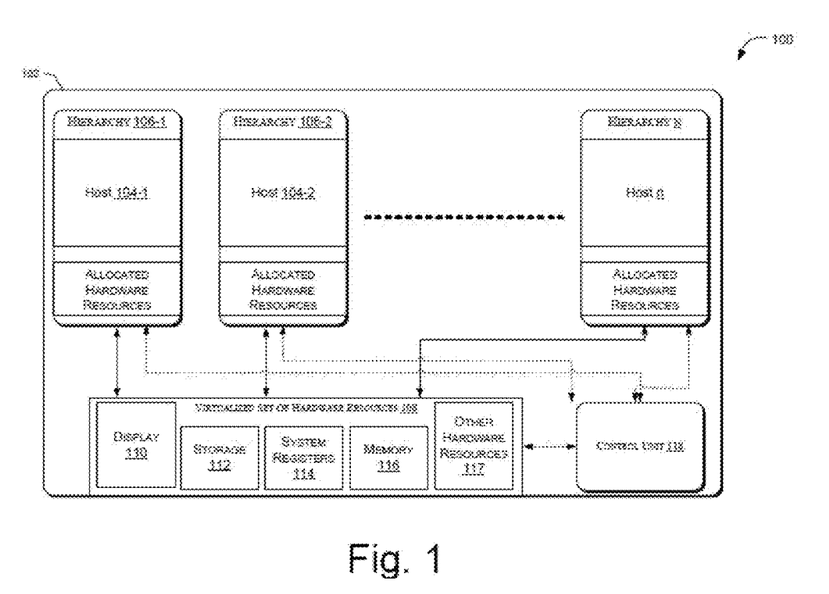
FIG. 1 illustrates a hierarchical wearable processing unit of a wearable electronic device, in accordance with an embodiment of the present subject matter.
Figure 2A:
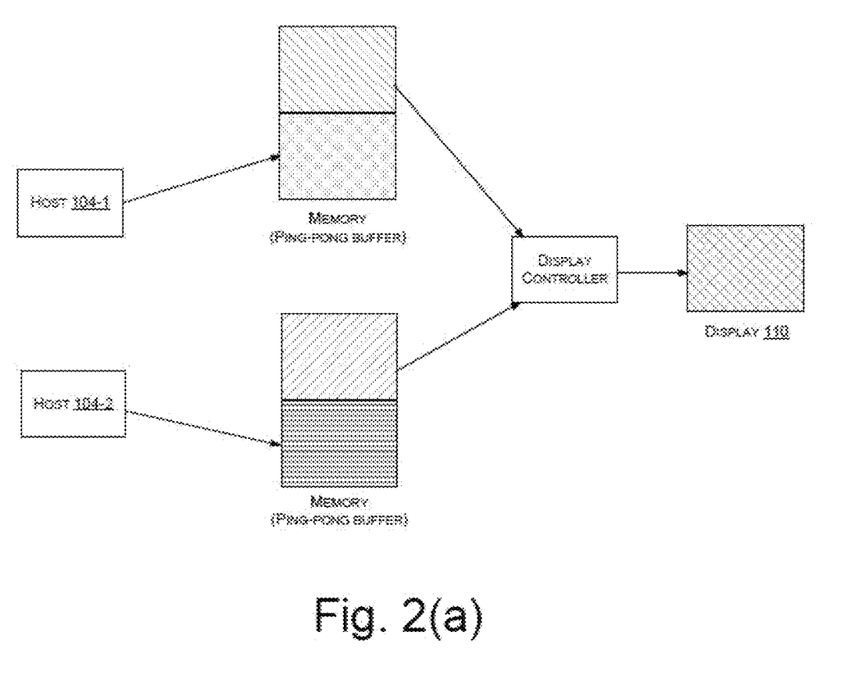
FIG. 2(a) illustrates an implementation of sharing the display of a wearable electronic device, in accordance with an embodiment of the present subject matter.
Figure 2B:
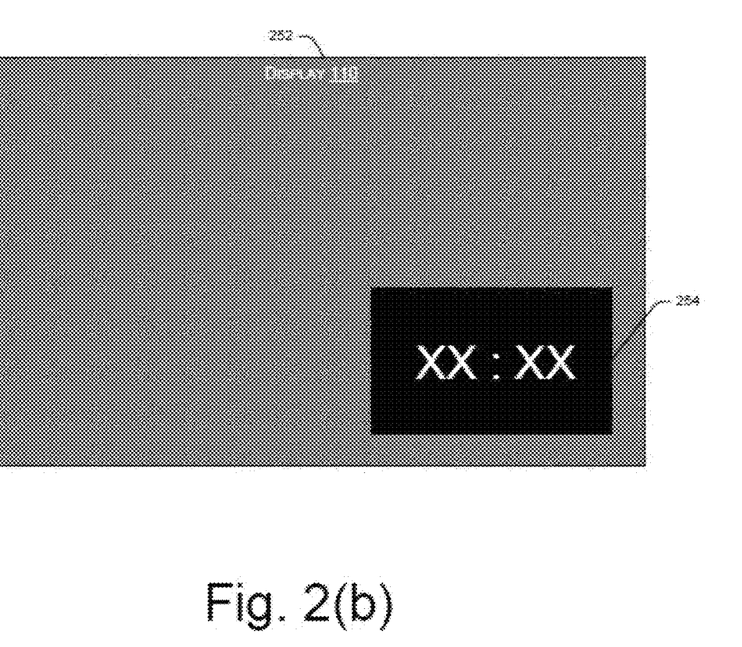
FIG. 2(b) illustrates a partial display rendering mechanism in a wearable processing unit (WPU), in accordance with an embodiment of the present subject matter.
Figure 2C:
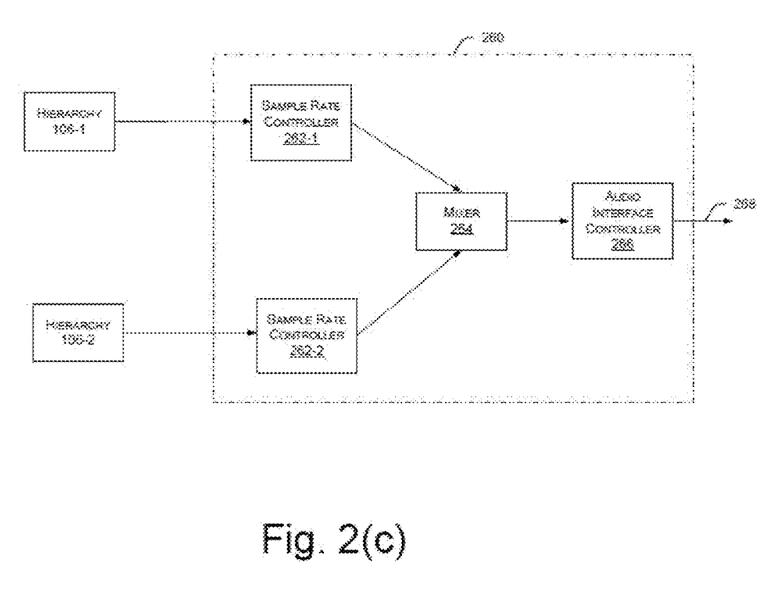
FIG. 2(c) illustrates a shared audio interface architecture in a WPU, in accordance with an embodiment of the present subject matter.
Figure 2D:
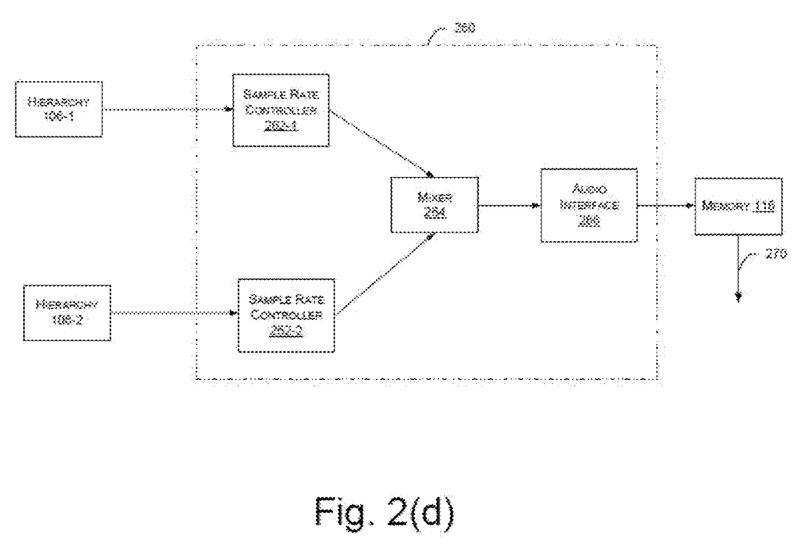
FIG. 2(d) illustrates a shared audio interface architecture in a WPU, in accordance with an embodiment of the present subject matter.
Figure 2E:
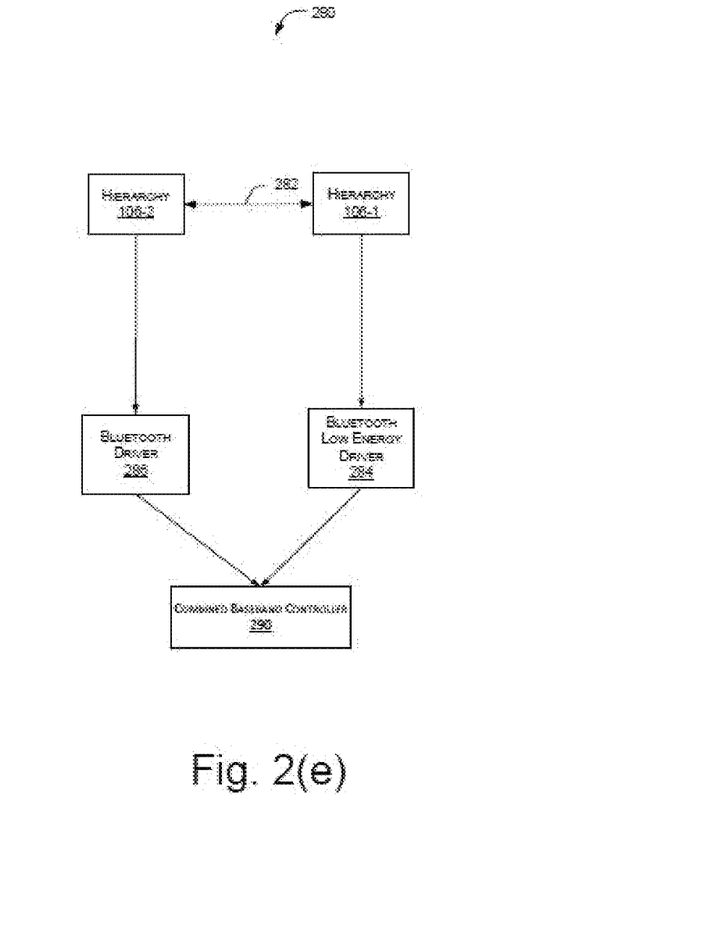
FIG. 2(e) illustrates a Bluetooth and Bluetooth Low Energy sharing architecture in a WPU, in accordance with an embodiment of the present subject matter.
Figure 3A:
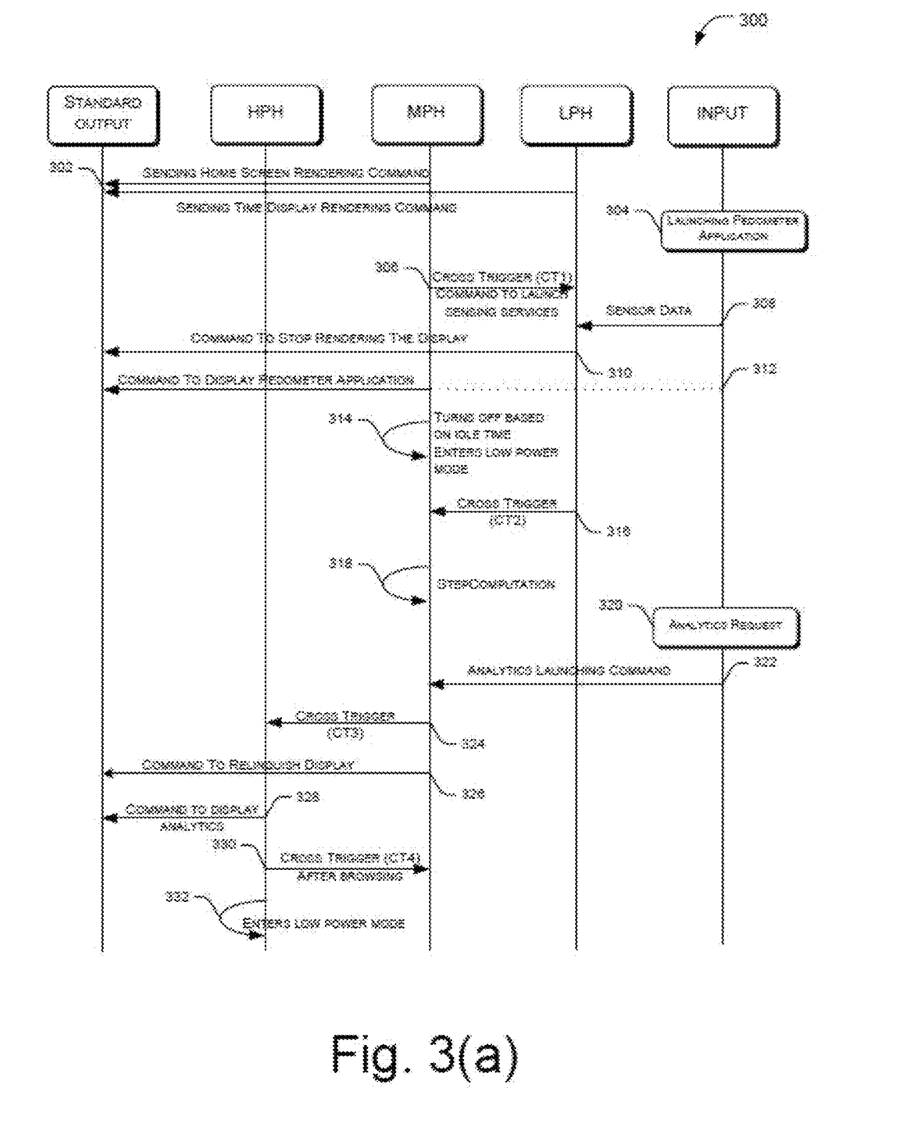
Figure 3B:
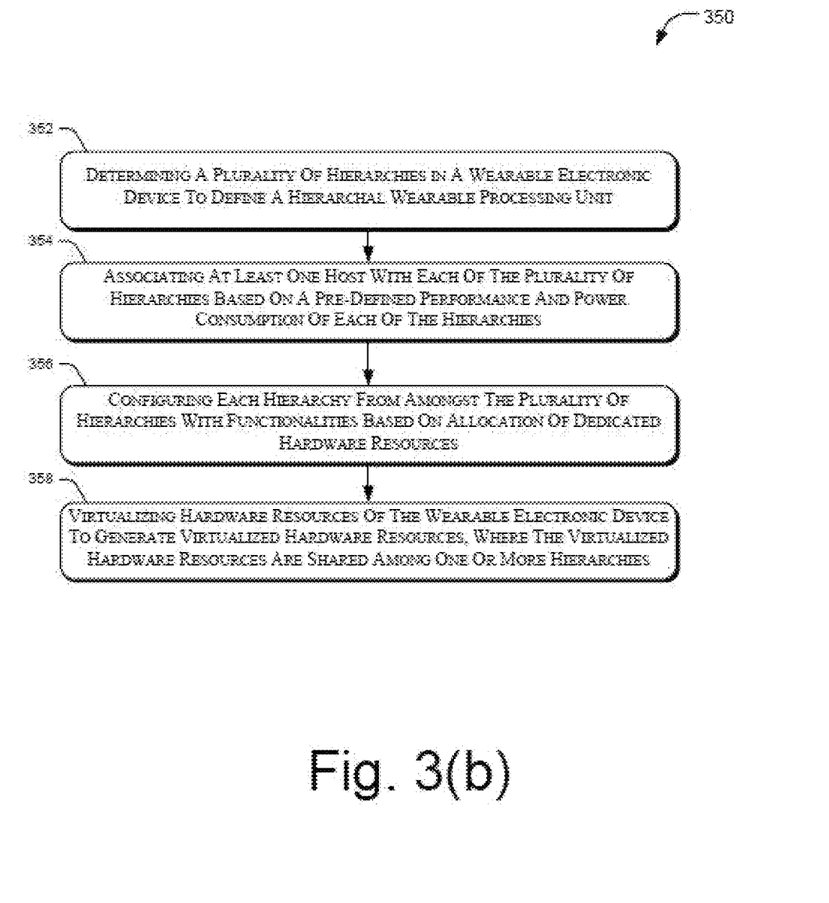
FIG. 3(b) illustrates a method of implementation of hierarchical WPU, in accordance with an embodiment of the present subject matter.

The manner in which the described systems and methods to optimize power consumption of a WPU shall be implemented has been explained in details with respect to the FIG. 1-3. While aspects of described systems and methods can be implemented in any number of different computing systems, transmission environments, and/or configurations, the embodiments are described in the context of the following exemplary system(s).

It should be noted that the description merely illustrates the principles of the present subject matter. It will thus be appreciated that those skilled in the art will be able to devise various arrangements that, although not explicitly described herein, embody the principles of the present subject matter and are included within its scope. Moreover, all statements herein reciting principles, aspects, and embodiments of the present subject matter, as well as specific examples thereof, are intended to encompass equivalents thereof.

WPUs that can implement the disclosed system(s) and method(s) include, but are not limited to, a wrist band, a pedometer, a head rest, a necklace, a wrist watch, an ear piece, an anklet, a finger ring, a pair of hand gloves, a pair of foot wears, a pendent, and the like.

FIG. 1 illustrates a WPU 100 implementing a hierarchical wearable processing unit (HWPU) 102 including multiple hierarchies, according to an implementation of the present subject matter. In said implementation, the HWPU 102 includes a plurality of hosts 104-1, 104-2, . . . , 104-N, collectively referred to as hosts 104 and individually referred to as host 104 hereinafter. Further, the HWPU 102 also includes multiple hierarchies 106-1, 106-2, . . . , 106-N, collectively referred to as hierarchies 106 and individually referred to as hierarchy 106 hereinafter. In order to reduce hardware redundancy, the hierarchical architecture may facilitate sharing of hardware resources and peripherals among the hosts 104.

The HWPU 102 can be understood as a multi host environment where more than one hosts 104 share a common pool of hardware resources of the WPU. For example, the HWPU 102 may include or may be connected to various storage controllers, like NAND flash memory, multimedia cards (MMC), Consumer Electronics Advanced Technology Attachment (CEATA); connectivity modules like baseband interfaces, Serial Peripheral Interfaces (SPI), Inter-integrated Circuit (I2C), infrared data association (IrDA) compliant devices; media controllers like camera, integrated inter chip sound (I2S); media accelerators like audio encode-decode engines, video encode-decode engines, graphics accelerator; security modules like encryption engines, key generators; communication modules like Bluetooth, Wi-Fi, Ethernet; universal serial bus (USB) connected devices like pen drives, memory sticks, etc. The HWPU 102 may be implemented in various types of electronic systems and is not restricted to only WPUs. The HWPU 102 may be implemented in various other portable electronic systems.

The different hosts 104 may include high, medium and low performance processors which may have different processing capabilities. The hosts 104 may be implemented as one or more microprocessors, microcomputers, microcontrollers, digital signal processors, central processing units, state machines, logic circuitries, and/or any devices that manipulate signals based on operational instructions. Among other capabilities, the processor(s) may be configured to fetch and execute computer-readable instructions stored in the memory.

Further, each of the hierarchy 106 may also be allocated with some of the dedicated hardware resources of the WPU 100. For example, the hierarchy 106-1 may be provided with a dedicated peripheral like a graphic controller. Similarly, the hierarchy 106-2 may be provided with other dedicated peripherals, like audio and media controllers. The final hierarchy 106-n may be provided with some of the sensors, like gyroscope and accelerometer. Therefore, each of the hierarchy 106 may include one or more dedicated hardware resources of the WPU 100. Although it has been described that a limited group of hardware resources may be defined to be dedicatedly allocated to each hierarchy, it would be appreciated that the description merely included some examples and either more, or less hardware resources may also be dedicatedly available with each hierarchy 106.

The hardware resources may include, but not limited to, I/O peripherals, algorithm accelerators, storage controllers, connectivity controllers, and memory. Since the number and type of hardware resources may vary from one hierarchy 106 to another, each hierarchy may enable certain functionalities of the WPU 100. In other words, the composition the hardware resources in the hierarchies 106 may depend on the functionality to be supported by the WPU 100. The hardware resources may include I/O peripherals which may either be high, medium, or low performance resources and may include, but not limited to, Inter Integrated Circuits (I2C) devices, Universal Asynchronous Receiver/Transmitter (UART) devices, Serial Peripheral Interface (SPI) devices, Integrated Inter-chip Sound (I2S) devices, Universal Serial Bus (USB) devices, Secure Digital (SD) devices and NAND devices. The accelerators utilized in the WPU 100 may include, but are not restricted to, video decoders, audio processors, etc., based on the end user device in which the HWPU is to be implemented.

In one implementation of the present subject matter, the hardware resources of the WPU 100 which are allocated to different hierarchies 106 may also be transferred from one hierarchy 106 to another. In other words, based on the requisite of the WPU 100 from time to time, a hardware resource dedicated to hierarchy 106-2 may be withdrawn from the hierarchy 106-2 and provided to the hierarchy 106-1. Similarly, another dedicated resource available with the hierarchy 106-1 may be provided to the hierarchy 106-n, and so on.

According to the present subject matter, some of the common hardware resources of the WPU 100 may be utilized by more than one hierarchy 106 of the HWPU 102. To this end, such hardware resources may be virtualized to form a set of virtualized set of hardware resources 108 for the utilization by the hierarchies 106. The virtualized set of hardware resources 108 may include virtualized common resources, such as display 110, storage 112, system registers 114, memory 116, and other hardware resources 117. The virtualization of the hardware resources may allow all the hierarchies 106 to simultaneously and partially utilize the virtualized set of hardware resources 108. For example, the memory 116 of the WPU 100 may be virtualized and provided to all the hierarchies 106 such that each hierarchy 106 may utilize the memory 116 as a dedicated hardware resource.

In the virtualized set of hardware resources, the display 110 may include, but not limited to, a light emitting diode (LED) display, plasma display, liquid display, electronic paper and e-Ink display, Organic light-emitting diode (OLED) display, Active-matrix organic light-emitting diode (AMOLED) display, Thin Film Diode (TFD) display, and laser display. Further, the memory 116 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

The different techniques of virtualization are well known and have been omitted for the sake of brevity. Since the usage of such components is well known, the components have not been shown, and their description has also been omitted for the sake of brevity.

In another implementation of the present subject matter, the HWPU 102 may include a control unit 118. The control unit 118 may configure the HWPU 102, and may monitor the allocation and sharing of different hardware resources of the WPU 100. In one implementation, the control unit 118 may determine hierarchies in the HWPU 102 based on predefined performance and power consumption for each hierarchy. In said implementation, the control unit 118 may define functionalities of the hierarchies and allocate the hardware resources of the WPU 100 for dedicated use by the hierarchies 106. The allocation of the hardware resources may be based on the functionalities determined to be provided by each of the hierarchy 106. For example, the control unit 118 may define three different hierarchies in the HWPU 102, such as hierarchy 106-1, 106-2, and 106-3. The three hierarchies 106 may be defined as an ultra low performance hierarchy 106-1, a medium performance hierarchy 106-2, and a high performance hierarchy 106-3.

In said implementation, the ultra low performance hierarchy 106-1 may provide limited functionalities, such as collection of data, sensor monitoring, and basic data processing. The medium performance hierarchy 106-2 may provide functionalizes which either does not require high computations and may be required intermittently. And, the high performance hierarchy 106-3 may be configured such that it may provide high computation functionalities, such as data analysis, encoding, and decoding of data.

Accordingly, the ultra low performance hierarchy 106-1 may be provided with dedicated control of hardware resources like sensor interface controllers, timers, and an ultra low power host 104 which may perform sensor interfacing, data collection, and such basic data processing like filtering, etc. Similarly, the medium performance hierarchy 106-2 may include accelerators and interfaces which may be based on interactive operations from user, for example, MP3 decoding, universal serial bus (USB) control, etc.; and medium performance host 104 which may support sensor analysis algorithms or server/client operating systems (OS) for supporting Internet of Things (IoT) and for handling media related applications. Further, the high performance hierarchy 106-3 may include higher performance acceleration units for rich user interface experiences, such as graphics controller and video encoder/decoder. The high performance hierarchy 106-3 may also include a high performance host 104 which may support remote data store/retrieve related tasks like cloud interfacing, and may also support application rich OS that can run multi-day/multi-week data analysis algorithms and contextual computations.

In one implementation, the control unit 118 may enable the three hierarchies 106-1, 106-2, and 106-3 to work in parallel, or based on the requirement of the computations or processing of the tasks. For instance, in a situation where the WPU 100 is collecting and processing the collected data, the control unit 118 may allocate the task of collecting the data to the ultra low performance hierarchy 106-1 and may provide the processing of data to the medium performance hierarchy 106-2. The high performance hierarchy 106-3 may merely be initiated during situations when high processing is to be done or, high graphics are to be provided to the user.

Therefore, as described above, all the hierarchies 106 may process data and perform task(s) in a unified way to project the HWPU 102 as a unified system to a user. In other words, a parallel set of applications work on two or more processors in tandem to generate the required output of a grand application.

Further, the utilization of the hierarchies may allow efficient usage of resources to conserve power and processing capabilities. To this end, the control unit 118 may independently enable and disable hierarchies by powering down and powering up such hierarchies depending upon the requisites. In other words, one or more hierarchies may be in power down state and may not perform any function. Such a capability of the HWPU 102 may allow the battery power of the WPU 100 to be conserved while ensuring that the low power and ultra low power hierarchies are in power on state to complete the basic functionalities, such as collection of data.

The control unit 118 may also switch tasks between hierarchies while performing the powering up and powering down certain hierarchies. In one implementation of the present subject matter, the control unit 118 may switch the tasks automatically, based on requisite of the HWPU 102, or may perform the switching in response to an external event like loss of external power source, undocking from the charging or docking station, etc., or be triggered by the user input either through hardware or software.

As described above, instead of three hierarchies 106-1, 106-2, and 106-3, the control unit 118 may define and configure multiple hierarchies 106 based on the requisite of tasks to be performed by the WPU 100, to offload computations of any higher compute level hierarchies among lower level hierarchies through parallel processing of applications. In one implementation, the control unit 118 ensures that sufficient peripherals and acceleration units are included in each hierarchy to ensure working and functioning of each of the defined hierarchy 106.

Apart from the allocation of the dedicated hardware resources among the hierarchies 106 and ensuring a unified working of each task, the control unit 118 may also enable virtualization of the common hardware resources such that the common hardware resources can be shared among the hierarchies 106 simultaneously or sequentially. In operation, the control unit 118 may allow concurrent usage capability to the display 110, concurrent usage of Bluetooth and Bluetooth low energy (BLE), sharing of audio interfaces, seamless communication across the hosts 104, sharing the user input events, and capability to share memory 116 and storage devices, based on the virtualized set of hardware resources 108.

For example, the control unit 118 may virtualize display controller of the display 110 and provide it to two hierarchies 106-1 and 106-2 for rendering of data. In other words, the display 110 of the WPU may project data received from one or more hierarchies 106. FIG. 2(*a*) depicts the implementation where two hierarchies 106-1 and the hierarchy 106-2 share the display 110. In said implementation, the display controller of the display 110 may provide plane(s) level control to each hierarchy 106-1 and the hierarchy 106-2.

Typically, processor updates a display attached to it by updating its display content into a ping-pong buffer. As the display controller starts rendering the data from one ping-pong buffer, the processor starts updating the content to be rendered on to an alternate ping-pong buffer. As and when the display controller generates frame sync interrupt, the processor switches the plane buffer address in the display controller to a newly updated ping-pong buffer location.

FIG. 2(*a*) depicts how the display 110 is shared based on a virtualized display controller of the display 110. In said implementation, the initialization of the display controller and the display 110 may be handled by any one of the hierarchies 106-1, or the hierarchy 106-2. Different planes of the display 110 may be provided to different hierarchies 106 such that each hierarchy is capable of updating one plane. While planes of the display 110 are simultaneously shared, run time changes of display controller/panel settings can be done with a proper inter processor policy mechanism. An inter processor communication (IPC) channel can enable communication channel across the hosts 104 to exchange any information between the hosts for event/application/system level coherence. The IPC channel can be used to exchange any information regarding peripheral status and handing off/requesting peripheral ownership across the hierarchies 106. The IPC may be understood as a low latency high bandwidth data bus implemented as an inter host link. In one implementation, the IPC may also facilitate exchange of messages between the multiple hosts 104.

Therefore, once the host 104-1 of the hierarchy 106-1 has updated the plane content in a ping-pong buffer, the host 104-1 may provide such information to the host 104-2 of the other hierarchy 106-2 through the IPC. Thereafter, the host 104-2 may update the ping-pong buffer with the content to be rendered and also update the buffer address with the display controller. Therefore, the hosts 104 of both the hierarchies 106-1 and 106-2 may communicate to share the display 110.

The display 110 sharing in WPUs 100 enable the unified experience to the end user. For example, in the case of a Pedometer, hierarchy 106 with moderate processing capabilities may display the pedometer application in one ping-pong buffer and the hierarchy 106 with low processing capabilities may display the steps or time. Blending of such two contents to bring up the unified feel for device may then be achieved by the sharing of the display of the pedometer.

In accordance with another embodiment of the subject matter, partial rendering of the display 110 may be implemented to reduce power consumption of the WPU 100. In said implementation, in order to support display in very low power states with the lowest possible memory footprint, the control unit 118 may configure the display controller of the display 110 to support partial display rendering mechanism. The partial display rendering mechanism is illustrated in FIG. 2(*b*).

To leverage the partial display rendering mechanism, the control unit 118 may segregate the display 110 in portions 252 and 254. Each portion 252 and 254 may be updated by a different hierarchy, such as hierarchy 106-1 and hierarchy 106-2. The hierarchy 106-1 may be provided with the control of the portion 252 while the hierarchy 106-2 may be provided with the control of the portion 254.

In one implementation, one hierarchy 106, such as the hierarchy 106-1 may be provided with control of one or more portions, such as 252 and 254 simultaneously while the other hierarchies, such as the hierarchy 106-2 may be provided with a limited control of the portions of the display, such as merely 254.

In the above described example, the entire display 110, including the portions 252 and 254, may be utilized by the hierarchy 106-1 when complete information relating to different aspects is to be provided to a user. However, when the WPU 100 is in a standby state, the hierarchy 106-2 may control the portion 254 and provide updated time XX:XX. In one implementation, during the partial display rendering mechanism, while any one of the portions 252 or 254 is being utilized by a hierarchy, the display controller of the display 110 may fill any preset color to the unused portion of the display 110.

In an implementation of the present subject matter, audio interface and audio controller of the WPU 100 may also be shared among the hierarchies 106 to reduce power consumption of the WPU 100. In said implementation, the control unit 118 may configure the audio controller and the audio interface of the WPU 100 such that one or more hierarchies 106 may share them at the same time. The mechanism of sharing the audio controller and audio interface is illustrated in FIG. 2(*c*).

FIG. 2(*c*) depicts an audio controller 260, shared among the hierarchies 106-1 and 106-2, by the control unit 118. The control unit 118 may configure the shared audio controller 260 to supports integrated mixing capability using which different hierarchies 106 can render audio independently. In said implementation, the control unit 118 may provide a sample rate controller 262-1 to the hierarchy 106-1 and a sample rate controller 262-2 to the hierarchy 106-2. Accordingly, the shared audio controller 260 may receive input though different input channels which can be assigned to different hosts 104 of different hierarchies 106 and the data received may be mixed to be provided to an audio interface controller 266. The audio interface controller 266 may produce a unified audio data output which may then be rendered to the speakers through an audio interface 268.

As shown in FIG. 2(*c*), the audio data is sent to a codec which is directly connected to the shared audio controller 260. However, in situations where the audio data is received on an interface other than a connected codec, there needs to be a further processing to convert the raw data to an interface specific format, for example conversion of data to A2DP for Bluetooth devices. FIG. 2(*d*) depicts the flow of data in situations when the audio data is to be provided in an interface specific format, the audio controller 260 may write out the mixed audio data to the memory 116 from where that data may be further packetized and sent on to the required interface 270 like Bluetooth.

In an implementation of the present subject matter, Bluetooth controller and Bluetooth low energy (BLE) controller may also be shared by the controller unit 118 among the hierarchies 106. FIG. 2(*e*) represents an architecture 280 of sharing Bluetooth controller of the WPU 100. In said implementation, the control unit 118 may provide a Bluetooth/BLE combination control module to the hierarchies 106. It would be appreciated that the Bluetooth is typically used in different applications where the data rates are high enough to transfer files, stream music, voice data etc., and the BLE mode is typically used for sending smaller information at a lower rate like notifications, health sensor data etc.

For the purpose of sharing the Bluetooth/BLE among the hierarchies 106, the controller unit 118 may share baseband controllers of the Bluetooth/BLE interface with the hierarchies 106. In one implementation, a virtual BLE driver 284 may be shared with the hierarchy 106-1 and a virtual Bluetooth Driver 286 may be shared with the Hierarchy 106-2. The virtual BLE driver 284 and the virtual Bluetooth Driver 286 may be based on a combined baseband Bluetooth/BLE controller 290.

In one implementation, the hierarchy 106-1 may be a low performance hierarchy and may be provided with the BLE driver 284 while the hierarchy 106-2 may be a high performance hierarchy may be provided with the Bluetooth driver 286. Along with these the BLE driver 284 & Bluetooth driver 286, the IPC 282 may also be provided to the hierarchies 106 to coordinate the ownership of different drivers. In said implementation, the Bluetooth driver 286 provided to the on the high performance hierarchy may utilize the IPC 282 to communicate with the BLE driver 284 on the low performance hierarchy to identify any pending transactions from the combined baseband controller 290 which can be completed by the Bluetooth driver 286. Similarly, BLE driver 284 may communicate through the IPC 282 to identify any pending transactions from the combined baseband controller 290 which can be completed by the BLE driver 284.

In another implementation, the control unit 118 may provide two separate logical interfaces to the hierarchies 106, one each for the Bluetooth driver 286 and the BLE driver 284.

Since the usage of memory 116 and the system registers 114 of the WPU 100 effect the power consumption and performance of the WPU 100, in one implementation of the present subject matter, the control unit 118 may also manage the shared memory 116 and the system registers 114, in a similar way like that of the display 110. As the size and frequency of the memory usage increases, the power consumption also increases proportionately. Therefore, to achieve optimum power consumption by each hierarchy, the control unit 118 may create different memory segments for each hierarchy 106. Further, for each hierarchy 106, the control unit may also tune the segment size and frequency of operation to satisfy just-enough requisites of the hierarchy 106.

In one implementation of the present subject matter, for the hardware resources shared among the different hierarchies 106, same system level views from all the hosts 104 may be maintained by each hierarchy 106. Maintaining same system level view may ease the communication across the hosts 104, and thereby may avoid any additional translations. For example, having same memory map view from all the hosts 104 may allow identification of a peripheral with the same address by all the hosts.

Similarly, implementation of a similar interrupt ordering may also allow in identification of any event related communication without any additional remapping. Thus all the events/interrupts are routed in the same order to all the hosts 104 across the hierarchies 106 and owned based on the policies as exchanged over IPC 282 and all the hosts may have a similar view of the interrupts. In other words, the interrupts and the events may be shared among the hosts simultaneously or partially in same order. For example, in situation where an event which is shared between a host 104 with moderate processing capabilities and a host with high processing capabilities, the former can ignite the event if the later is in a power down state. Consider a smart watch as the WPU 100 in which the hosts 104 with moderate and high processing capabilities are in sleep state. If in such a situation, a user touches the screen of the smart watch, a touch interrupt may be sent to the host 104 with moderate processing capabilities, which in turn may wake up the host with low or high processing capabilities, depending on the nature of the interrupt.

In one implementation, the control unit 118 may place the hierarchies 106 which utilize higher power, in lowest possible state, or even in power down state for a major portion of the time such that full advantage of hierarchical structure may be utilized and maximum power efficiency can be provided to the WPU 100. As described earlier, while the higher processing hierarchies 106 are in a low power state, the hierarchies 106 with lower processing power may keep track of the complete events/interrupts that occur in the HWPU 102. In said implementation, based on requisite of the HWPU 102, the control unit 118 may also initiate wake up procedure for the higher power hierarchies 106 in the low power state or the power down state. Further, In order to allow the higher power hierarchies 106 to transition to low power states, such as sleep state, standby state, or hibernate state, the control unit 118 may also manage the power management controls like the clock gating, power gating, reset sequencing, etc.

According to an implementation of the present subject matter, the HWPU 102 implemented in the WPU 100 may include three different hierarchies, the ultra low performance hierarchy 106-1, a medium performance hierarchy 106-2, and a high performance hierarchy 106-3.

In such a situations, the following flow of events may be observed: An application may be initiated by a user through a graphic user interface (GUI) running on the high performance hierarchy 106-3. Then, another application of the medium performance hierarchy 106-2 may initiate a sensing mechanism. Further, the sensing mechanism may trigger a sensing task on the ultra low performance hierarchy 106-1. Then the high performance hierarchy 106-3 may then switch to a low power state. The switching to the low power state may be triggered by the control unit based 118 on a timer or preset sleep event.

Similarly, medium performance hierarchy 106-2 may also switch to a low power state. The switching to the low power state may be triggered by the control unit 118 based on a timer or preset sleep event. Once upper hierarchies switch to the low power state, the ultra low performance hierarchy 106-1 may initiate collection of data based on sensors associated with it. The low power host 104-1 of the ultra low performance hierarchy 106-1 may perform a first level of processing of the data, such as filtering and averaging. The first level of processing may either be defined by the control unit 118, or may be defined by the sensing mechanism. In one implementation, the obtained sensing data or the processed data may then be stored on to a local memory and the sensing task may be carried out based on the number of sensors and their periodic sampling requirements.

Based on either the sensing mechanism, or the control unit 118, once the sensed data from a particular sensor reaches a particular number of samples or based on the value of the sensed data, may wake up the medium performance hierarchy 106-2 from the low power state. Thereafter, the medium performance hierarchy 106-2 may check for the event based on which it is woken up. The collected and pre-processed data stored by the ultra low performance hierarchy 106-1 may then be further processed by the medium performance hierarchy 106-2 based on the sensing mechanism and, the resultant data may either be stored in a memory or any other storage device. Once the processing required by the medium performance hierarchy 106-2 is completed, it may again switch to a low power state.

Further, the ultra low performance hierarchy 106-1 may continue to sense data and perform basic functions of processing. In said implementation, based on the control unit 118, or by an occurrence of an external trigger, the high performance hierarchy 106-3 may be woken up from the low power state. The high performance hierarchy 106-3 may perform higher level compute function, such as displaying a graph or displaying of wearable application related data. While the high performance hierarchy 106-3 is in power up state, the other hierarchies may also remain in the power up state to support any offloading by the high performance hierarchy 106-3. Finally, once the compute task is over, high performance hierarchy 106-3 may again switch to the low power state.

In one implementation, the HWPU 102 may support a pedometer application of a WPU 100. In said implementation, the HWPU 102 may again include a 3-tiered hierarchy which includes a Low Performance Hierarchy (LPH), a Medium Performance Hierarchy (MPH), and a High Performance Hierarchy (HPH). In said implementation, the MPH may own the display 110 by default while the LPH may share the display 110 with a limited access to one plane of the display 110 while rendering a home screen. The HPH may be used for special cloud based services like analytics which are part of the pedometer application running on the HWPU 102.

As described above, the display 110 may be simultaneously rendered by the MPH and LPH for the home screen. In said implementation, the LPH may render a clock portion of the display 110, such as the portion 254, while the MPH may render the rest of the portion of the home screen, such as the portion 252. In such implementation, while the home screen is switched to a low power state and the HPH is switched to a low power state; the clock portion of the display 110 may be maintained by the LPH. If a user launches the pedometer application through the home screen, the MPH may send a cross trigger (CT1) to the LPH through IPC 282, intimating the launch of pedometer application along with commands to launch sensing services. In such a situation, based on these inputs, the LPH may stop rendering the time display and disables the plane in the display controller of the display 110 and the MPH may initiate rendering of the Pedometer application on the display.

In said implementation, while the LPH is collecting data based on different sensors like accelerometer and gyroscope, the MPH may turn off the display 110. Also, if required, the MPH may also switch to a low power state while the LPH is collecting the requisite data.

Once the required number of samples are collected by the LPH, or after an expiry of a time interval, the MPH may be woken up from the low power state, based on a cross trigger (CT2). Once in active state, the MPH may perform computation for the purpose of the pedometer application. In said implementation, the pedometer application is assumed to have Analytics features which require higher computation and cloud based services and therefore corresponds to another application in the HPH. At any point of time if the user chooses to launch such Analytics, the MPH may wake the HPH from the low power state based on a cross trigger (CT3). Through an IPC command from the MPH, the HPH may launch the Analytics application on the cloud. Further, the MPH may also relinquish control of the display 110 and let the HPH take the control of the display 110. In one implementation, the handoff for exchange of display control may include multiple request-acknowledge cycles, which would be understood by those skilled in the art.

In the described implementation, while the user browses through the Analytics features on HPH, the MPH and LPH may continue in the background with sensing and step calculations. Once the user has completed the intended task, the control may be returned back by the HPH through a cross trigger CT4 via the IPC, to the MPH. Subsequently, the HPH may switch to a low power state once the control is given back to the MPH.

In another implementation, the HWPU 102 may support a smart watch application of the WPU 100. The smart watch application of the WPU 100 may also be implemented on the 3-tiered hierarchy which includes the LPH, the MPH, and the HPH. In said implementation, display 110 of the WPU 100 may be rendered by the LPH, by default for displaying the time and the MPH and the HPH may be placed in ultra low power mode by the control module 118. The smart watch application on the WPU 100 may support various interfaces, including an audio input interface, such as a microphone. Therefore, the LPH interfaces to a microphone through which the voice data can be captured and processed.

In one implementation, the LPH may detect any voice activity and may initiate voice capturing through. Further, the LPH may implement pre-defined Voice Activity Detection Algorithms (VAD) and noise cancellation algorithms to identify received inputs from a user. In situations when a new sound is detected, the LPH may find a match for the first Keyword. For example, if the user utters Hello Watch, the LPH may identify the input and to identify if there is a match to a pre-defined instruction, the LPH make wake up MPH and hand over the audio collection and processing audio samples to the MPH. For the sake of explanation, voice processing performed by hierarchies has been referred to as hierarchical voice processing.

Upon initiation of the MPH, it may scan the inputs for any commands that the user may have provided in a particular interval of time. If within a time window, after wake up, the MPH has not received any command, the MPH may chose to return back to low power mode by handing over the control to the LPH through a cross trigger. If in case there is a command detected, the MPH may take action accordingly. For example if the command detected is 'Time', the MPH will initiate a "text to speech" application to announce the current time. In another example if the received command requires a cloud based voice search which requires a higher computation and faster connectivity options, the MPH may wake up the HPH and send a cross trigger to launch a cloud based advanced natural language processing by handing over the listening job. Based on the cloud search services, the user can use further commands on the smart watch application through the HPH. For example, upon returning from cloud based search, the HPH may involve a voice based command for exiting the application. Similar to the MPH time out, the HPH may also go back to low power mode after a pre-determined time period. In one implementation, the timeout for HPH may be longer than MPH.

An event flow 300, among different entities of the HWPU 102 implementing the pedometer application has been depicted in FIG. 3(a). As described above, it would be understood that the hierarchies 106 may communicate with each other through the IPC and compute the data received from the sensors and the user interface. The computations and analytics may be displayed to the user on the display 110, referred to as a standard display.

The flow described hereinafter may be described in the general context of computer executable instructions. Generally, computer executable instructions can include routines, programs, objects, components, data structures, procedures, modules, functions, etc., that perform particular functions or implement particular abstract data types.

The order in which the flow is described is not intended to be construed as a limitation, and any number of the described steps can be combined in any order to implement the flow, or an alternative flow. Additionally, individual steps may be deleted from the flow without departing from the scope of the subject matter described herein. Furthermore, the flow can be implemented in any suitable hardware, software, firmware, or combination thereof.

At step 302, the MPH and LPH may render the standard display simultaneously. In one implementation, such may be the default state of output of the HWPU 102.

At step 304, a user may launch the pedometer application. In response to such an action, the MPH may send the cross trigger (CT1) to the LPH at step 306. The CT1 may be communicated to the LPH through the IPC. Through the CT1, the MPH may request the LPH to initiate sensing services.

At step 308, the LPH may initiates collection of data as input and, stops rendering the time plane on the standard output at step 310. As described, once the LPH may stop rendering data to the standard output, the display controller may entirely be controlled by the MPH.

At step 312, the MPH may start rendering the Pedometer application to the standard output. At step 314, the MPH may switch to a low power state. Thereafter, based on either a timer or an external trigger, the LPH may send the cross trigger (CT2) to wake up MPH at step 316. The MPH may then perform any step computations and any other related computations at step 318.

Thereafter, the user may request initiation of analytics application at step 320. Upon such a request by the user, a command to launch the analytics application may be received by the MPH at step 322.

At step 324, the MPH may generate the cross trigger (CT3) for the HPH with a request to launch the analytics application. At 326, the MPH may relinquishes the control of the standard output and the HPH may take control of the standard output at step 328. While the user browses through the Analytics feature on HPH, the MPH and LPH may continue to run in the background with sensing and step computations.

At step 330, once the user is done with the browsing, the control of the standard output may be returned back by the HPH through a cross trigger (CT4) and may switch to a low power state at step 332.

In one implementation of the present subject matter, similar to the pedometer application, different applications, such as gesture recognition based applications, speech recognition based applications, and applications supporting contextual computation may be implemented in a HWPU 102.

FIG. 3(b) describes a method 350 of implementation of a hierarchical wearable processing unit (HWPU) in a WPU. In one implementation, the HWPU may be implemented in the WPU 100, such as the HWPU 102.

At step 352, a plurality of hierarchies in a WPU, to define a hierarchical wearable processing unit is determined. In one implementation, the plurality of hierarchies may be determined for pre-defined performance and power consumption. In one implementation, each of the hierarchy from amongst the plurality of hierarchies may provide different performance. For example, a hierarchy 106-1 may be defined for ultra low performance while another hierarchy 106-3 may be defined for a high performance.

At step 354, at least one host may be associated with each of the plurality of hierarchies based on a pre-defined performance and power consumption of each of the hierarchies. The at least one host may be understood as processors of different and varied performance capabilities. One processor may include higher performance capability and may utilize high power, while another may include lower performance nut may also utilize lower power.

At step 356, each hierarchy from amongst the plurality of hierarchies may be configured with functionalities based on allocation of dedicated hardware resources. In one implementation, the hierarchy which is for the purpose of low performance may be associated with low power consumption hardware resources, such as sensors. Similarly, the hierarchy which supports high performance may be associated with hardware resources which provide high performance, such as graphic accelerators.

At step 358, common hardware resources of the WPU are virtualized to generate virtualized hardware resources, where the virtualized hardware resources are shared among one or more hierarchies. In one implementation, the common hardware resources may include hardware resources, such as display, memory and system registers.

Although implementations of the Hierarchical Wearable Processing Unit have been described in language specific to structural features and/or methods, it is to be understood that the appended claims are not necessarily limited to the specific features or methods described. Rather, the specific features and methods are disclosed as exemplary implementations for utilization of the Hierarchical Wearable Processing Units.

What is claimed is:

1. A method for providing hierarchical wearable processing unit (HWPU) in a Wearable processing Unit (WPU), the method comprising:
   determining a plurality of hierarchies in the WPU to define the (HWPU), wherein each hierarchy from amongst the plurality of hierarchies is determined for a particular performance and power consumption, and wherein each hierarchy from amongst the plurality of hierarchies is configured to execute at least one of independent applications and tasks;
   associating at least one host with each of the plurality of hierarchies based on the particular performance and power consumption of each of the plurality of hierarchies;
   configuring each hierarchy from amongst the plurality of hierarchies with functionalities based on allocation of dedicated hardware resources, wherein the functionalities performed by the each hierarchy through the allocated dedicated hardware resources conform with the particular performance and power consumption of each of the hierarchy; and
   virtualizing a set of common hardware resources to form virtualized set of hardware resources, wherein the virtualized set of hardware resources is shared among one or more hierarchies from amongst the plurality of hierarchies, wherein the virtualized set of hardware resources includes a display and the display is sequentially shared by different applications, and wherein the different applications are executed by the one or more hierarchies.

2. The method as claimed in claim 1, wherein the particular performance and power consumption is one of a pre-defined performance and power consumption, and a run time performance and power consumption.

3. The method as claimed in claim 1, wherein the one or more hierarchies execute at least one of different applications and tasks utilizing the virtualized set of hardware resources.

4. The method as claimed in claim 1, wherein the method further comprises configuring the plurality of hierarchies to share at least one of interrupts and events of the WPU.

5. The method as claimed in claim 1, wherein the method further comprises configuring each of the plurality of hierarchies to communicate with other hierarchies from amongst the plurality of hierarchies based on an inter processor communication (IPC) channel wherein the IPC is a dedicated channel to communicate data and controls between hosts.

6. A method for providing hierarchical wearable processing unit (HWPU), in a Wearable processing Unit (WPU), the method comprising:
   determining a plurality of hierarchies in the WPU to define the (HWPU), wherein each hierarchy from amongst the plurality of hierarchies is determined for a particular performance and power consumption, and wherein each hierarchy from amongst the plurality of hierarchies is configured to execute at least one of independent applications and tasks;
   associating at least one host with each of the plurality of hierarchies based on the particular performance and power consumption of each of the plurality of hierarchies;

configuring each hierarchy from amongst the plurality of hierarchies with functionalities based on allocation of dedicated hardware resources, wherein the functionalities performed by the each hierarchy through the allocated dedicated hardware resources conform with the particular performance and power consumption of each of the hierarchy; and virtualizing a set of common hardware resources to form virtualized set of hardware resources, wherein the virtualized set of hardware resources is shared among one or more hierarchies from amongst the plurality of hierarchies, wherein the virtualized set of hardware resources includes a display and the display is partially shared by different applications, and wherein the different applications are executed by the one or more hierarchies.

7. A method for providing hierarchical wearable processing unit (HWPU), in a Wearable processing Unit (WPU), the method comprising:

determining a plurality of hierarchies in the WPU to define the (HWPU), wherein each hierarchy from amongst the plurality of hierarchies is determined for a particular performance and power consumption, and wherein each hierarchy from amongst the plurality of hierarchies is configured to execute at least one of independent applications and tasks;

associating at least one host with each of the plurality of hierarchies based on the particular performance and power consumption of each of the plurality of hierarchies;

configuring each hierarchy from amongst the plurality of hierarchies with functionalities based on allocation of dedicated hardware resources, wherein the functionalities performed by the each hierarchy through the allocated dedicated hardware resources conform with the particular performance and power consumption of each of the hierarchy; and virtualizing a set of common hardware resources to form virtualized set of hardware resources, wherein the virtualized set of hardware resources is shared among one or more hierarchies from amongst the plurality of hierarchies, wherein the virtualized set of hardware resources includes a combined baseband controller, and wherein the combined baseband controller shares at least one of a Bluetooth driver and a Bluetooth Low energy among the one or more hierarchies.

8. A method for providing hierarchical wearable processing unit (HWPU), in a Wearable processing Unit (WPU), the method comprising:

determining a plurality of hierarchies in the WPU to define the (HWPU), wherein each hierarchy from amongst the plurality of hierarchies is determined for a particular performance and power consumption, and wherein each hierarchy from amongst the plurality of hierarchies is configured to execute at least one of independent applications and tasks;

associating at least one host with each of the plurality of hierarchies based on the particular performance and power consumption of each of the plurality of hierarchies;

configuring each hierarchy from amongst the plurality of hierarchies with functionalities based on allocation of dedicated hardware resources, wherein the functionalities performed by the each hierarchy through the allocated dedicated hardware resources conform with the particular performance and power consumption of each of the hierarchy; and virtualizing a set of common hardware resources to form virtualized set of hardware resources, wherein the virtualized set of hardware resources is shared among one or more hierarchies from amongst the plurality of hierarchies, wherein the virtualized set of hardware resources includes an audio controller and the audio controller is simultaneously utilized by different applications, and wherein the different applications are executed by the one or more hierarchies.

9. A method for providing hierarchical wearable processing unit (HWPU), in a Wearable processing Unit (WPU), the method comprising:

determining a plurality of hierarchies in the WPU to define the (HWPU), wherein each hierarchy from amongst the plurality of hierarchies is determined for a particular performance and power consumption, and wherein each hierarchy from amongst the plurality of hierarchies is configured to execute at least one of independent applications and tasks;

associating at least one host with each of the plurality of hierarchies based on the particular performance and power consumption of each of the plurality of hierarchies;

configuring each hierarchy from amongst the plurality of hierarchies with functionalities based on allocation of dedicated hardware resources, wherein the functionalities performed by the each hierarchy through the allocated dedicated hardware resources conform with the particular performance and power consumption of each of the hierarchy;

identifying one or more hierarchies of the HWPU in an idle state; and switching the one or more hierarchies to a low power state based on the identifying.

10. The method as claimed in claim 9, wherein the method further comprises switching the one or more hierarchies to an active state based on a pre-defined timer.

11. The method as claimed in claim 9, wherein the method further comprises switching the one or more hierarchies to an active state based on occurrence of a trigger.

12. The method as claimed in claim 9, wherein the method further comprises virtualizing a set of common hardware resources to form virtualized set of hardware resources, wherein the virtualized set of hardware resources is shared among one or more hierarchies from amongst the plurality of hierarchies.

13. The method as claimed in claim 12, wherein the virtualized set of hardware resources include at least one of a display, a storage, system registers, and a memory.

14. The method as claimed in claim 12, wherein the virtualized set of hardware resources includes a memory and the memory is simultaneously utilized by different applications, and wherein the different applications are executed by the one or more hierarchies.

15. A method for providing hierarchical wearable processing unit (HWPU), in a Wearable processing Unit (WPU), the method comprising:

determining a plurality of hierarchies in the WPU to define the (HWPU), wherein each hierarchy from amongst the plurality of hierarchies is determined for a particular performance and power consumption, and wherein each hierarchy from amongst the plurality of hierarchies is configured to execute at least one of independent applications and tasks;

associating at least one host with each of the plurality of hierarchies based on the particular performance and power consumption of each of the plurality of hierarchies;

configuring each hierarchy from amongst the plurality of hierarchies with functionalities based on allocation of dedicated hardware resources, wherein the functionalities performed by the each hierarchy through the allocated dedicated hardware resources conform with the particular performance and power consumption of each of the hierarchy;

receiving a task to be processed by the HWPU of the WPU;

splitting the task into one or more sub-tasks for parallel processing;

providing the one or more sub-tasks to one or more hierarchies from amongst the plurality of hierarchies for the parallel processing;

receiving result of the processed one or more sub-tasks from the one or more hierarchies; and providing a unified result corresponding to the task.

16. A hierarchical wearable processing unit (HWPU) of a WPU, the HWPU comprising:

a plurality of hierarchies, wherein each hierarchy from amongst the plurality of hierarchies is determined for a particular performance and power consumption;

a plurality of hosts, wherein one or more hosts from amongst the plurality of hosts are associated with each of the plurality of hierarchies based on the particular performance and power consumption of each of the hierarchies; and a control unit to configure each of the plurality of hierarchies with functionalities based on allocation of dedicated hardware resources, wherein the functionalities performed by each hierarchy through the allocated dedicated hardware resources conform with the particular performance and power consumption of each of the hierarchies, and wherein each hierarchy is configured to execute at least one of independent applications and tasks based on the dedicated hardware resources, wherein the control unit further virtualizes a set of common hardware resources to generate virtualized set of hardware resources, and wherein the virtualized set of hardware resources are shared among one or more hierarchies from amongst the plurality of hierarchies, wherein the virtualized set of hardware resources includes a display and the display is simultaneously shared by different applications, and wherein the different applications are executed by the one or more hierarchies.

17. The HWPU as claimed in claim 16, wherein the one or more hierarchies execute at least one of different applications and tasks utilizing the virtualized set of hardware resources.

18. The HWPU as claimed in claim 17, wherein the execution is based on hierarchical voice processing.

19. The HWPU as claimed in claim 16, wherein the control unit further configures the plurality of hierarchies to share at least one of interrupts and events of the WPU.

20. The HWPU as claimed in claim 16, wherein the HWPU further comprises an IPC channel to communicate data between hosts of different hierarchies from amongst the plurality of hierarchies.

21. The HWPU as claimed in claim 16, wherein the control unit configures each of the plurality of hierarchies to communicate with other hierarchies from amongst the plurality of hierarchies based on an inter processor communication (IPC) channel.

22. A hierarchical wearable processing unit (HWPU) of a WPU, the HWPU comprising:

a plurality of hierarchies, wherein each hierarchy from amongst the plurality of hierarchies is determined for a particular performance and power consumption;

a plurality of hosts, wherein one or more hosts from amongst the plurality of hosts are associated with each of the plurality of hierarchies based on the particular performance and power consumption of each of the hierarchies; and a control unit to configure each of the plurality of hierarchies with functionalities based on allocation of dedicated hardware resources, wherein the functionalities performed by each hierarchy through the allocated dedicated hardware resources conform with the particular performance and power consumption of each of the hierarchies, and wherein each hierarchy is configured to execute at least one of independent applications and tasks based on the dedicated hardware resources, wherein the control unit;

identifies the one or more hierarchies of the HWPU in an idle state; and switches the one or more hierarchies to a low power state based on the identifying.

23. The HWPU as claimed in claim 22, wherein the control unit switches the one or more hierarchies to an active state based on a pre-defined timer.

24. The HWPU as claimed in claim 22, wherein the control unit switches the one or more hierarchies to an active state based on occurrence of a trigger.

25. A non-transitory computer-readable medium having computer-executable instructions that when executed perform acts comprising:

determining a plurality of hierarchies in the WPU to define the hierarchical wearable processing unit, wherein each hierarchy from amongst the plurality of hierarchies is determined for a particular performance and power consumption, and wherein each hierarchy from amongst the plurality of hierarchies is configured to execute at least one of independent applications and tasks associating at least one host with each of the plurality of hierarchies based on the particular performance and power consumption of each of the hierarchies;

configuring each hierarchy from amongst the plurality of hierarchies with functionalities based on allocation of dedicated hardware resources, wherein the functionalities performed by the each hierarchy through the allocated dedicated hardware resources conform with the particular performance and power consumption of each of the hierarchies; and virtualizing a set of common hardware resources to form virtualized set of hardware resources, wherein the virtualized set of hardware resources is shared among one or more hierarchies from amongst the plurality of hierarchies, wherein the virtualized set of hardware resources includes a display and the display is sequentially shared by different applications, and wherein the different applications are executed by the one or more hierarchies.

* * * * *